(12) United States Patent
Kanai

(10) Patent No.: US 9,093,870 B2
(45) Date of Patent: Jul. 28, 2015

(54) FLAT MOTOR

(75) Inventor: Naoki Kanai, Nagano (JP)

(73) Assignee: NIDEC SEIMITSU CORPORATION, Ueda-shi, Nagano (JP)

( * ) Notice: Subject to any disclaimer, the term of this patent is extended or adjusted under 35 U.S.C. 154(b) by 208 days.

(21) Appl. No.: 13/813,282

(22) PCT Filed: Jun. 10, 2011

(86) PCT No.: PCT/JP2011/063343
§ 371 (c)(1),
(2), (4) Date: Jan. 30, 2013

(87) PCT Pub. No.: WO2012/017737
PCT Pub. Date: Feb. 9, 2012

(65) Prior Publication Data
US 2013/0127277 A1    May 23, 2013

(30) Foreign Application Priority Data

Aug. 4, 2010  (JP) ................ 2010-175071

(51) Int. Cl.
| | | |
|---|---|---|
| *H02K 7/08* | (2006.01) | |
| *H02K 1/28* | (2006.01) | |
| *H02K 5/167* | (2006.01) | |
| *H02K 7/06* | (2006.01) | |
| *H02K 1/27* | (2006.01) | |

(52) U.S. Cl.
CPC .............. *H02K 7/085* (2013.01); *H02K 1/28* (2013.01); *H02K 5/1675* (2013.01); *H02K 7/063* (2013.01); *H02K 1/2793* (2013.01)

(58) Field of Classification Search
USPC ............... 310/81, 90, 156.08, 156.12, 156.26
IPC .............................. H02K 7/061, 7/063
See application file for complete search history.

(56) References Cited

U.S. PATENT DOCUMENTS

| | | | | |
|---|---|---|---|---|
| 7,132,770 | B2 * | 11/2006 | Yamaguchi et al. ............ | 310/81 |
| 7,173,355 | B2 | 2/2007 | An et al. | |
| 8,378,539 | B2 * | 2/2013 | Kanai .............................. | 310/81 |
| 2004/0084980 | A1 | 5/2004 | Yamaguchi et al. | |
| 2006/0022537 | A1 | 2/2006 | Yamaguchi et al. | |

FOREIGN PATENT DOCUMENTS

| | | |
|---|---|---|
| CN | 1638246 A | 7/2005 |
| JP | 2005-27484 | 1/2005 |
| JP | 2006-94644 | 4/2006 |
| JP | 2007-104740 | 4/2007 |

* cited by examiner

*Primary Examiner* — Dang Le
(74) *Attorney, Agent, or Firm* — Drinker Biddle & Reath LLP

(57) ABSTRACT

A flat motor has a standard cylindrical bearing and the structure for fastening the bearing by sufficient strength. The flat motor has a rotor frame that is rotatably supported by a bearing through which the shaft passes, and the frame has: flat portion which is formed by a flat plate and which has central hole; outer cylindrical portion which is formed in a cylindrical shape on the side of central hole of flat portion by bending the flat plate and lengthening in an axial direction of the shaft; and inner cylindrical portion to which bearing is fastened, and which is formed in a cylindrical shape on the inner circumstance side of outer cylindrical portion by bending the flat plate at the end opposite to the end of flat portion on the inside of rotor frame and lengthening in a direction contrary to the direction in which outer cylindrical portion lengthens.

4 Claims, 4 Drawing Sheets

FLAT MOTOR

FIELD OF THE INVENTION

The present invention relates to a flat motor built into a mobile phone and the like, more particularly relates to a fastening structure of a bearing of flat motor.

BACKGROUND ART

Conventionally, the flat vibration motor is a brushless motor, for example. The flat vibration motor has: a stainless steel disk shaped base plate on which one end of a shaft presses into a burring portion; a stainless steel cylindrical case which has a bottom portion and an open portion covered with the base plate, and in which the other end of the shaft fits into a shaft mounting hole; a rotor frame which has an axial direction field type rotor magnet and eccentric weight, and is supported to be able to rotate via a slide bearing through which the shaft runs; and a flexible printed circuit substrate which is laminated on the base plate and mounts a plurality of air core coils, current control IC's, and the other electronic devices.

The rotor frame has a flange projecting inward. The slide bearing is fastened to the flange by swaging.

PRIOR ART REFERENCES

Patent Documents

[Patent Document 1] Japanese Laid-Open Patent Application No. 2005-27484 (FIG. 5)

SUMMARY OF THE INVENTION

The Problems Solved by the Invention

In the above flat vibration motor, because the slide bearing fastened to the rotor frame by swaging has a circular projection for swaging at an outer periphery of the rotor frame, the slide bearing has a unique shape. Therefore, the production cost of the flat vibration motor becomes expensive. Further, the number of the production processes of the flat vibration motor increases by performing the swaging process when the flat vibration motor has the slide bearing. Also the production cost of the flat vibration motor becomes expensive by the swaging process.

Furthermore, because of transformation of a part of the slide bearing, the swaging process has the potential to transform the bearing itself or generate a defect of shape of a shaft insertion hole. Therefore, the mounting accuracy and concentricity of the slide bearing can be reduced.

When the swaging process is not employed, a cylindrical bearing holder is shaped in the rotor frame, and the rotor frame has the structure for fastening the bearing by fitting into the cylindrical bearing holder, the bearing can be formed in a standard cylindrical shape. However, in this case, fastening strength of the bearing can be insufficient, and then the bearing can drop off the flat vibration motor while driving the flat vibration motor.

In view of the above problems, an object of the present invention is to provide a flat motor in which a standard cylindrical bearing can be used, and which has the structure for fastening the bearing by sufficient strength.

Problem Resolution Means

The flat motor according to the present invention has: a stator that supports one end of a shaft; a case that has a cylindrical portion with an open portion covered with the stator and that supports the other end of the shaft; and a rotor frame that is rotatably supported by a bearing through which the shaft passes, wherein the rotor frame having a cylindrical flat shape has: a flat portion formed by a flat plate; an outer cylindrical portion that is formed in a cylindrical shape by bending the flat plate at the center of the flat portion and by lengthening in an axial direction of the shaft; and an inner cylindrical portion that is formed in a cylindrical shape on an inner circumstance side of the outer cylindrical portion by bending the flat plate at the top of the outer cylindrical portion on the inside of the rotor frame and by lengthening in a direction contrary to the direction in which the outer cylindrical portion lengthens, and the bearing is fastened by elastically fitting into the inner cylindrical portion.

Since the inner cylindrical portion of the rotor frame is formed by bending the flat plate at the top of the outer cylindrical portion on the inside of the rotor frame, and by lengthening in a direction contrary to the direction in which the outer cylindrical portion lengthens, in the inner cylindrical portion the force is generated, as reaction force generated based on mainly bending, toward the inside of the rotor frame with a focus on the end opposite to the end of the outer cylindrical portion. By fastening the cylindrical bearing there, the cylindrical bearing is elastically fastened. Therefore, as compared with the conventional fastening of the bearing based on the press fitting, since the bearing always receives the force which acts from the inner cylindrical portion toward the inside of the rotor frame, the bearing is fastened by sufficient fastening strength.

Further, in the flat motor according to the present invention an inner jaw portion can be formed by projecting one end of the inner cylindrical portion to the inside of the rotor frame, wherein an end face of the bearing comes in contact with the inner jaw portion.

Since the end face of the bearing comes in contact with the inner jaw portion, the omission of the bearing from the shaft can be prevented, and fastening strength of the bearing can be further increased.

Efficacy of the Invention

According to the present invention, a standard cylindrical bearing can be used, and the flat motor which has the structure for fastening the bearing by sufficient fastening strength can be provided without the transformation of the bearing.

BRIEF DESCRIPTIONS OF THE DRAWINGS

EMBODIMENTS OF THE INVENTION

Next, the Embodiments of the present invention are explained based on the attached figures.

Embodiment 1

Figure 1A:
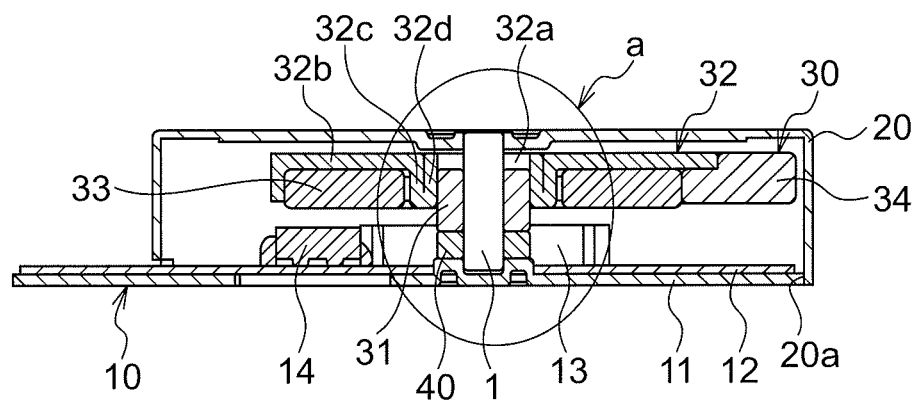
FIG. 1A is a longitudinal cross-section view showing the flat vibration motor of Embodiment 1 according to the present invention.
Figure 1B:
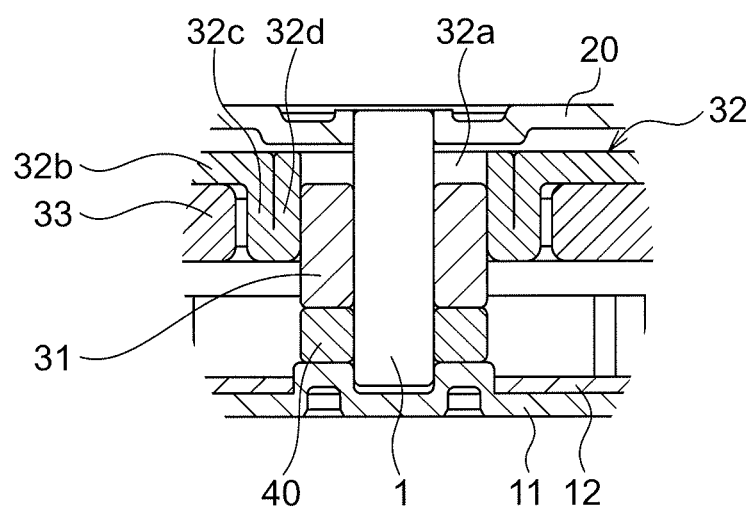
FIG. 1B is an enlarged view of "a" part indicated in FIG. 1A.

FIG. 1A is a longitudinal cross-section view showing the flat vibration motor of Embodiment 1 according to the present invention. FIG. 1B is an enlarged view of "a" part indicated in FIG. 1A.

The flat vibration motor according to the present invention is a brushless motor, for example. The flat vibration motor has: plate 11 which supports one end of shaft 1; and circuit substrate 12 which is laminated on plate 11. A plurality of air core coils 13 and electronic devices 14 are mounted on circuit substrate 12. Stator 10 is configured by plate 11, circuit substrate 12, core coils 13 and electronic devices 14.

Further, the flat vibration motor has: case 20 which supports the other end of shaft 1; and rotor 30 which is rotatably supported by bearing 31 through which shaft 1 passes. Open portion 20a of case 20 is covered with stator 10.

Rotor 30 has: bearing 31; rotor frame 32 which bearing 31 is fit into; rotor magnet 33 which is secured to rotor frame 32; and eccentric weight 34 which is similarly secured to rotor frame 32 on the outside of rotor magnet 33.

Rotor frame 32 having a cylindrical flat shape has: flat portion 32b which is formed by a flat plate and which has central hole 32a; outer cylindrical portion 32c which is formed in a cylindrical shape on the side of central hole 32a of flat portion 32b by bending the flat plate and lengthening in an axial direction of the shaft; and inner cylindrical portion 32d to which bearing 31 is fastened, and which is formed in a cylindrical shape on the inner circumstance side of outer cylindrical portion 32c by bending the flat plate at the end opposite to the end of flat portion 32b on the inside of rotor frame 32 and lengthening in a direction contrary to the direction in which outer cylindrical portion 32c lengthens. Additionally, numeral "40" is a washer to support rotor 30.

In such a configuration of rotor frame 32, since inner cylindrical portion 32d is formed by bending the flat plate at the end of outer cylindrical portion 32c on the inside of rotor frame 32, and lengthening in a direction contrary to the direction in which outer cylindrical portion 32d lengthens, in inner cylindrical portion 32d the force is generated, as reaction force generated based on mainly bending, toward the inside of rotor frame 32 with a focus on the end opposite to the end of outer cylindrical portion 32c.

By fastening cylindrical bearing 31 to inner cylindrical portion 32d (central hole 32a), cylindrical bearing 31 is elastically fastened by the force generated toward the inside. As compared with the conventional fastening based on the press fitting, since bearing 31 always receives the force which acts from inner cylindrical portion 32d toward the inside of rotor frame 32, bearing 31 is fastened by sufficient fastening strength. Therefore, since it is unnecessary to use a bearing which has a unique shape in order to fasten by swaging, a standard cylindrical bearing can be used. Further, the bearing can be fastened by sufficient fastening strength without the transformation of the bearing by fastening by swaging.

Embodiment 2

Figure 2A:
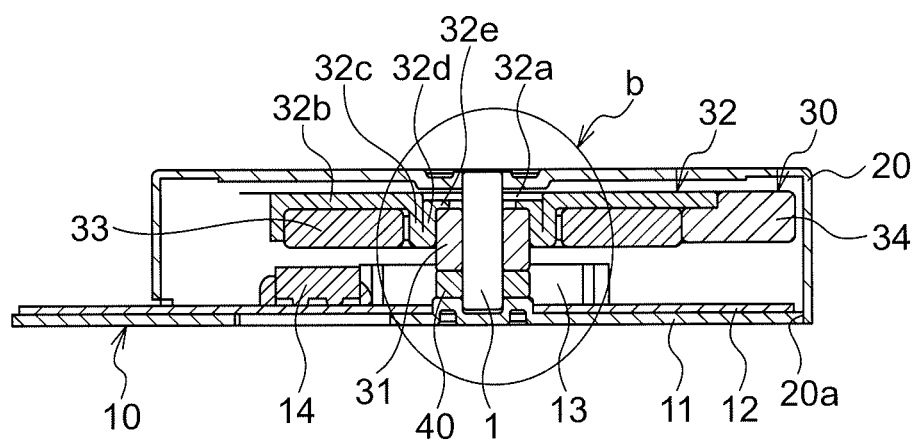
FIG. 2A is a longitudinal cross-section view showing the flat vibration motor of Embodiment 2 according to the present invention.
Figure 2B:
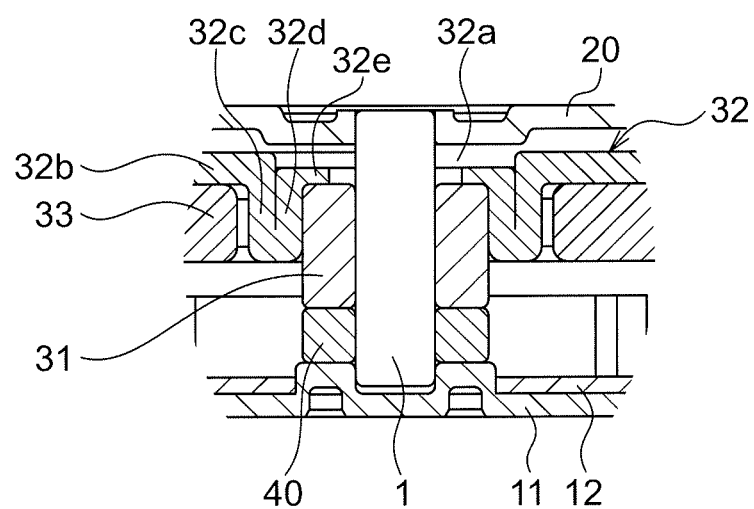
FIG. 2B is an enlarged view of "b" part indicated in FIG. 2A.

FIG. 2A is a longitudinal cross-section view showing the flat vibration motor of Embodiment 2 according to the present invention. FIG. 2B is an enlarged view of "b" part indicated in FIG. 2A. In FIGS. 2A and 2B, the same parts as parts indicated in FIGS. 1A and 1B has the same referential numbers as FIGS. 1A and 1B, and then the explanations of the same parts are omitted. The flat vibration motor of this embodiment is different in a part, rotor frame 32, from that indicated in FIGS. 1A and 1B. In the flat vibration of this embodiment, inner jaw portion 32e is formed by projecting one end of inner cylindrical portion 32d to the inside of the rotor frame, and an end face of bearing 31 comes in contact with inner jaw portion 32e.

Since bearing 31 comes in contact with inner jaw portion 32e, the omission of bearing 31 from shaft 1 can be prevented, and fastening strength of bearing 31 can be further increased.

In this embodiment, although inner jaw portion 32e is formed by inner cylindrical portion 32d, inner jaw portion 32e may be formed by outer cylindrical portion 32c, and then have the structure for projecting a part of outer cylindrical portion 32c on the inside of inner cylindrical portion 32d. Further, inner jaw portion 32e may be not only formed on the end of inner cylindrical portion 32d opposite to the other end formed by bending the plate on the side of outer cylindrical portion 32c, but also may be formed on the other end and on any part of inner cylindrical portion 32d expect for the both ends of inner cylindrical portion 32d.

Also, in this Embodiment, although outer cylindrical portion 32c lengthens in a downward direction of the figures, the structure where outer cylindrical portion 32c lengthens in an upward direction of the figures can be employed.

In this Embodiment, although the fixed shaft type of the flat vibration motor which has fixed shaft 1 is explained, the rotary type of the flat vibration motor can employ the above structure. Further, the flat vibration motor of the present invention can employ the conventional structures unless the points of the present invention are changed. Additionally, the present invention may have applicability to a flat motor as well as a vibrator motor.

DESCRIPTION OF THE REFERENCE NUMERALS

1 Shaft
10 Stator
11 Plate
12 Circuit substrate
13 Air core coil
14 Electronic device
20 Case
20a Open portion
30 Rotor
31 Bearing
32 Rotor frame
32a Central hole
32b Flat portion
32c Outer cylindrical portion
32d Inner cylindrical portion
32e Inner jaw portion
33 Rotor magnet
34 Eccentric weight
40 Washer

The invention claimed is:
1. A flat motor comprising:
a stator that supports one end of a shaft;
a case that has a cylindrical portion with an open portion covered with the stator and that supports the other end of the shaft; and
a rotor frame that is rotatably supported by a bearing through which the shaft passes and that has a rotor magnet,
wherein the rotor frame having a cylindrical flat shape has:
a flat portion formed by a flat plate;
an outer cylindrical portion that is formed in a cylindrical shape by bending the flat plate at the center of the flat portion and by lengthening in an axial direction of the shaft and that is disposed on the inside of a position at which the rotor magnet is secured to rotor frame; and an inner cylindrical portion that is formed in a cylindrical shape on an inner circumstance side of the outer cylindrical portion by bending the flat plate at the top of the outer cylindrical portion on the inside of the rotor frame and by lengthening in a direction contrary to the direction in which the outer cylindrical portion lengthens, wherein an inner surface of the outer cylindrical portion comes in contact with an outer surface of the inner cylindrical portion, and wherein the bearing is fastened by elastically fitting into the inner cylindrical portion.

2. The flat motor according to claim 1, wherein
an inner jaw portion is formed by projecting one end of the inner cylindrical portion or the outer cylindrical portion to the inside of the rotor frame, and an end face of the bearing comes in contact with the inner jaw portion.

3. The flat motor according to claim 2, wherein
a first surface of the outer cylindrical portion that presses the inner cylindrical portion in a radial direction of the shaft is formed, a second surface of the inner cylindrical portion presses the bearing in a radial direction of the shaft, and the first surface is formed within an area in which the second surface is formed in an axial direction.

4. The flat motor according to claim 1, wherein
a first surface of the outer cylindrical portion that presses the inner cylindrical portion in a radial direction of the shaft is formed, a second surface of the inner cylindrical portion presses the bearing in a radial direction of the shaft, and the first surface is formed within an area in which the second surface is formed in an axial direction.

* * * * *